Figure 1:
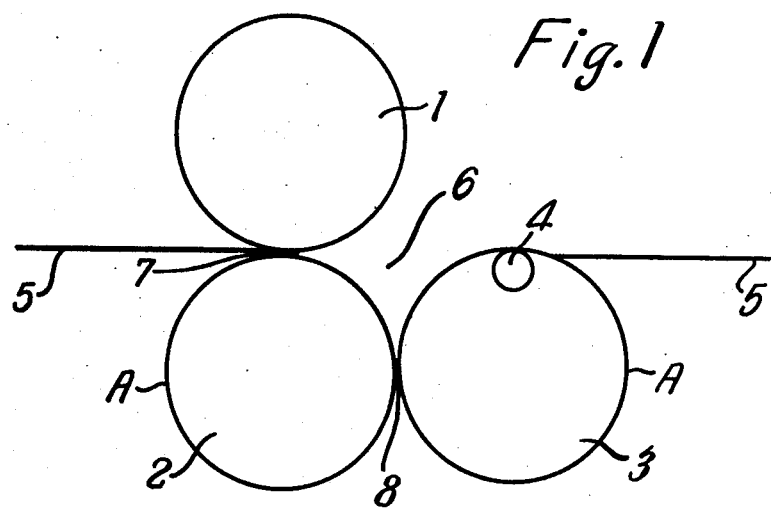

United States Patent [19]

Webb

[11] 4,112,689

[45] Sep. 12, 1978

[54] OIL BOOM

[75] Inventor: Michael Guthrie Webb, Wootton Bridge, England

[73] Assignee: The British Petroleum Company Limited, London, England

[21] Appl. No.: 821,159

[22] Filed: Aug. 2, 1977

[30] Foreign Application Priority Data

Aug. 6, 1976 [GB] United Kingdom ............... 32804/76

[51] Int. Cl.² ............................................. E02B 15/04
[52] U.S. Cl. ........................................ 405/63; 405/26; 210/DIG. 25
[58] Field of Search ............................... 61/1 F, 3–5; 210/DIG. 25, DIG. 26, 242

[56] References Cited

U.S. PATENT DOCUMENTS

| 3,221,884 | 12/1965 | Muller | 61/1 F |
| 3,476,246 | 11/1969 | Dahan | 210/DIG. 25 |
| 3,503,214 | 3/1970 | Desty et al. | 61/1 F |
| 3,533,240 | 10/1970 | Lesh | 61/1 F X |
| 3,567,019 | 3/1971 | Headrick | 61/1 F X |
| 3,631,984 | 1/1972 | Rath | 61/1 F X |

Primary Examiner—Dennis L. Taylor
Attorney, Agent, or Firm—Morgan, Finnegan, Pine, Foley & Lee

[57] ABSTRACT

The air/water figure of eight cross-section boom has an additional water chamber along side the original. The extra water boom has some buoyancy due to internal small air tube and thus forms a weir. Surface oil and water collects between the two water tubes and is recovered.

11 Claims, 3 Drawing Figures

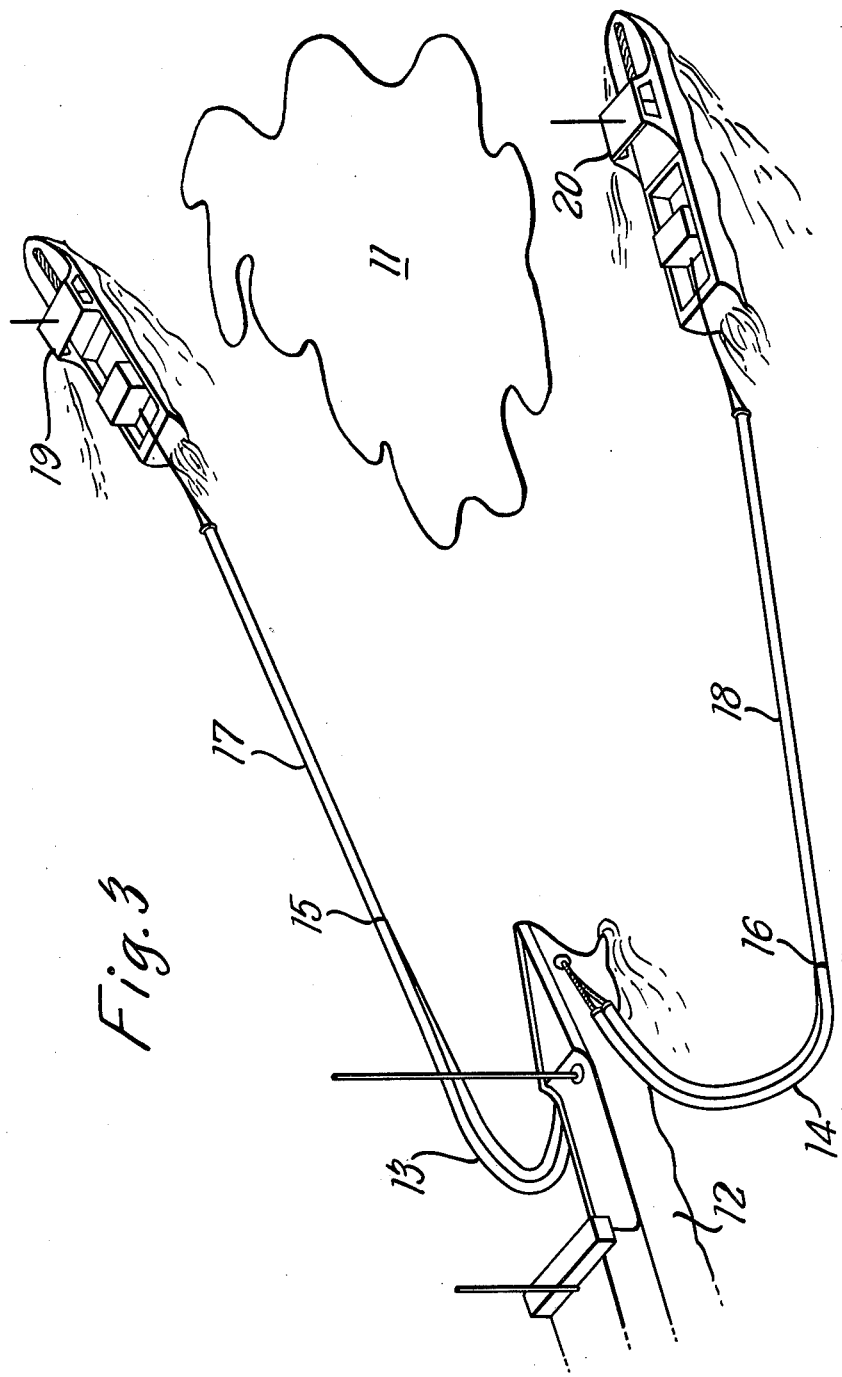

OIL BOOM

The present invention relates to a barrier for the containment and recovery of oil spilt on water.

Of recent years the occurences of oil spillage at sea have increased and as a result many proposals have been made for the containment and recovery of such spilt oil. Most systems that have been proposed have been designed to cope with finite spillages as may occur when a tanker or other oil carrying vessel is involved in an accident. With the increase in off-shore oil production there is an increase in the possibility of very large oil pollution occurring should oil wells blow out or oil pipes rupture. Although every precaution is taken to prevent such diasters and to minimise their effect by increasing oil shut off devices within any oil production unit there nevertheless remains a remote possibility that an accident to an oil production unit or to a very large tanker could produce a continuing source of oil pollution that would extend the capability of known oil containment and recovery systems.

British patent specificatons Nos. 1,188,156 and 1,383,315 describe barriers for oil spilt on water. The former describes a barrier which comprises one or more air chambers and one or more water chambers all the walls of said chambers being formed of flexible material, the chambers being so positioned that when suitably inflated with air and water the barrier will float with part below and part above the water surface so as to impede the passage of floating oil. Such a barrier is very effective for impedng the flow of oil and forming a corral within which the oil can be collected. The collected oil then has to be removed by some form of skimming device. The rate of oil removal is thus limited to the capacity of the skimming device employed.

An object of the present invention is to provide a barrier for the containment of oil spilt on water which can also be employed in its recovery.

According to the present invention a barrier for the containment and recovery of oil spilt on water comprises at least one elongated, flexible buoyant chamber, at least one elongated, flexible ballast water chamber and at least one further flexible water chamnber of greater buoyancy than the ballast chamber, the buoyant chamber and the further water chamber each being joined to the ballast water chamber in side by side relationship and the chambers being so positioned relative to one another that when in use on water the buoyant chamber and the ballast water chamber together form a barrier for oil spilt on water and the further water chamber defines a weir between itself and the other chambers, said weir being provided with means to remove oil and water therefrom.

The chambers of the present invention are essentially similar to those described in U.K. patent specification No. 1,118,156 and are flexible in order that they can follow the movement of the sea so that the barrier remains effective under sea conditions that would severely reduce the efficiency of a rigid barrier. Suitably they are made of sheets of flexible material e.g. neoprene coated nylon or other similar material. The flexibility of the material forming the barrier allows it to be stored, when deflated, in a comparatively small volume.

The chambers can be readily prepared from flat sheet material by welding or otherwise joining the sheets together and since all the chambers are joined together it may be convenient to form two or more chambers from a single sheet of the flexible material.

The flexible buoyant chamber and the ballast water chamber serve essentially the same function as the air and water chambers described in U.K. patent specification No. 1,188,156. In practice it is found that good results are obtained when the cross sectional areas of these two chambers are substantially the same but of cource barriers can readily be prepared in which the cross sectional areas vary, for example, in the ratio of 1:4 to 4:1. U.K. patent specification No. 1,383,315 describes the use of a pilot air tube in association with the air chamber in order to aid the deployment and recovery of the barrier. Such a pilot tube can usefully be incorporated in the barrier according to the present invention.

The further flexible water chamber has a greater buoyancy than the ballast chamber with the result that it floats relatively somewhat higher in the water than the ballast chamber. This is an essential feature of the present invention because the fact that the further water chamber is higher in the water than the ballast water chamber creates the weir in the barrier. The increased buoyancy of the further water chamber can be achieved in any convenient way for example by manufacturing the chamber from slightly more buoyant flexible material. However the preferred method of increasing the buoyancy of the further water chamber is to provide within it a relatively small flexible tube that can be inflated so as to impart the desired degree of extra buoyancy. This tube can be allowed to move freely within the further water chamber but is preferably attached to it at the point which in operation will be the upper surface of the further water chamber. This tube must be made of flexible material so that it does not impair the overall flexibility of the barrier. However it can be made of relatively inextensible material so that when inflated it will occupy a known volume within the further water chamber. If desired more than one tube of this type can be present in the further water chamber so that by inflation of one or more of such tubes the relative buoyancy of the water chamber can be varied at will. Alternativey the tube or tubes within the further water chamber can be extensible under air pressure and thus by varying the pressure to which the tube or tubes is or are inflated the buoyancy of the further water chamber can be controlled. It is found that when a barrier according to the present invention is deployed the inflation of the air tube within the further water chamber has a similar effect to the pilot air tube described in U.K. patent specification 1,383,315 and thus the deployment and recovery of the barrier can be increased by appropriate inflation of the air tube or tubes within the further water chamber.

The cross sectional area of the further water chamber may be of the same order as that of the ballast water chamber but again the areas may vary, for example in the ratio of 1:4 to 1:1.

In use the barrier will first have to be deployed and then the various air chambers inflated with air or water as appropriate. The deployment is aided by means of a pilot tube of the type described in the U.K. patent specification No. 1,383,315 or by means of the air tube in the further water chamber if either or both are present in the barrier.

The techniques described in U.K. patent specifications Nos. 1,188,156 and 1,383,315 can be used to inflate the chambers with air or sea water. In operation oil entrapped within the boom will spill over with sea water into the weir from which it must be removed. Suitable removal means comprise a series of drain holes in the weir through which the oil water mixture can flow into a collection vessel. Such drain holes can readily be provided in the manufacture of the barrier along the join of the further water chamber with the ballast water chamber. The drain holes are suitably connected to drain hoses through which the oil/water mixture can flow or be sucked to storage. A drain hose can be positioned within the further water chamber and pumps provided positively to pump recovered oil and water out of the barrier through the hose. A useful storage vessel can consist of a tanker that has been equipped with means for separation of oil and water so that the oil can be stored and the water returned to the sea.

Preferred barriers comprise a single air chamber, a single ballast chamber and a single further water chamber. However the function of each of these chambers may be achieved by replacing each of them or all of them with two or more separate chambers if desired.

Figure 2:
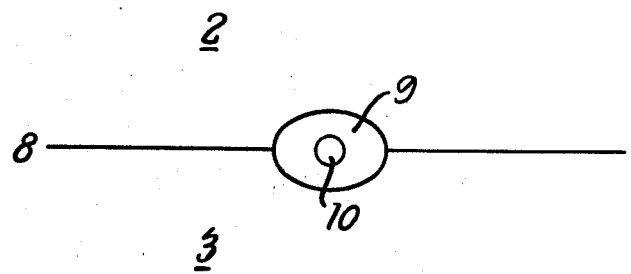

In the figures accompanying the Provisional Specification FIG. 1 is a vertical cross section of a boom according to the present invention and FIG. 2 is a partial horizontal cross section along the line AA of FIG. 1.

FIG. 3 is a diagrammatic representation of an oil recovery system employing a barrier according to the present invention.

In FIG. 1, 1 represents the flexible buoyant chamber and 2 represents the flexible ballast water chamber. 3 is the further water chamber which has a greater buoyancy than 2 due to the presence therein of an air tube 4. In use this barrier will float in relation to the sea water level 5 as indicated in FIG. 1 and thus it will be seen that the increased buoyancy of water chamber 3 causes it to float slightly higher than ballast water chamber 2 thus creating the weir 6 into which oil and water will spill when the boom is used to contain spilt oil In the barrier shown in FIG. 1 the air chamber 1 is connected to the ballast water chamber 2 in side by side relationship indicated by 7 and similarly the two water chambers are connected at the point 8.

In FIG. 2 the joining line 8 between chambers 2 and 3 is interrupted by a plate 9 in which there is a drain hole 10. A plurality of similar drain holes are provided at suitable distances along the weir so that adequate drainage is provided for the oil and water spilling over chamber 3.

FIG. 3 shows an oil spillage 11 which is drifting in the direction of a tanker 12 to which 2 barriers according to the present invention have been attached one on either side. These barriers 13 and 14 are connected at points 15 and 16 conventional barriers 17 and 18 which may be of the type described in U.K. patent specification No. 1,383,315. These in turn are connected respectively to boom deployment vessels 19 and 20 which provide the power to inflate the various chambers of the barriers appropriately. In practice the air and water chambers of the conventional barriers 17 and 18 can be connected directly with the corresponding chambers of the barriers according to the present invention. It may also be desirable to progressively increase the cross sectional area of the chambers as the combined barrier nears the tanker or storage vessel. The drain holes in the weir section of barriers 13 and 14 are connected by hoses which are not shown to the tanker 12. Preferably these connections run to a point in the tanker well below the water surface so that the oil water mixture in the weir runs under gravity to an appropriate place within the tanker where separation can be effected. The separated oil can then be stored in the tanker and the sea water, once sufficiently purified can be returned to the sea.

The system as shown in FIG. 3 can continue in operation for long periods provided that the tanker and the support boat 19 and 20 can keep station around the oil spillage 11 in such a way that the oil is driven into the barriers 13 and 14.

I claim:

1. A barrier for the containment and recovery of oil spilt on water comprising at least one elongated, flexible buoyant chamber, at least one elongated, flexible ballast water chamber and at least one further flexible water chamber of greater buoyancy than the ballast chamber, the buoyant chamber and the further water chamber each being joined to the ballast water chamber in side by side relationship and the chambers being so positioned relative to one another that when in use on water the buoyant chamber and the ballast water chamber together form a barrier for oil spilt on water and the further water chamber defines a weir between itself and the other chambers, said weir being provided with means to remove oil and water therefrom.

2. A barrier accoding to claim 1 wherein the ratio of the cross-sectional area of the buoyant chamber to that of the ballast water chamber is in the range 1:4 to 4:1.

3. A barrier according to claim 1 comprising a pilot air tube associated with the air chamber.

4. A barrier according to claim 1 wherein the further water chamber has provided within it a relatively small flexible tube which can be inflated to impart a desired degree of extra buoyancy.

5. A barrier according to claim 4 wherein the relatively small flexible tube is internally attached to the further water chamber along a line which in operation will be the upper surface of the further water chamber.

6. A barrier according to claim 1 wherein the ratio of the cross-sectional area of the further water chamber to that of the ballast water chamber is in the range 1:4 to 1:1.

7. A barrier according to claim 1 wherein the removal means comprises a series of drain holes in the weir through which an oil water mixture can flow to a collection vessel.

8. A barrier according to claim 7 wherein the drain holes are provided along the join of the further water chamber with the ballast water chamber.

9. A barrier according to claim 8 wherein the drain holes are connected to a drain hose through which the oil/water mixture can be passed to storage.

10. A barrier according to claim 9 wherein the drain hose is positioned within the further water chamber.

11. A barrier according to claim 10 wherein a pump is provided positively to pump oil and water out of the barrier through drain hose.

* * * * *